Feb. 12, 1935.   E. ZAHM   1,991,187
FILTER
Filed Dec. 23, 1933   5 Sheets-Sheet 2

INVENTOR
Edward Zahm
BY Popp & Powers
ATTORNEYS

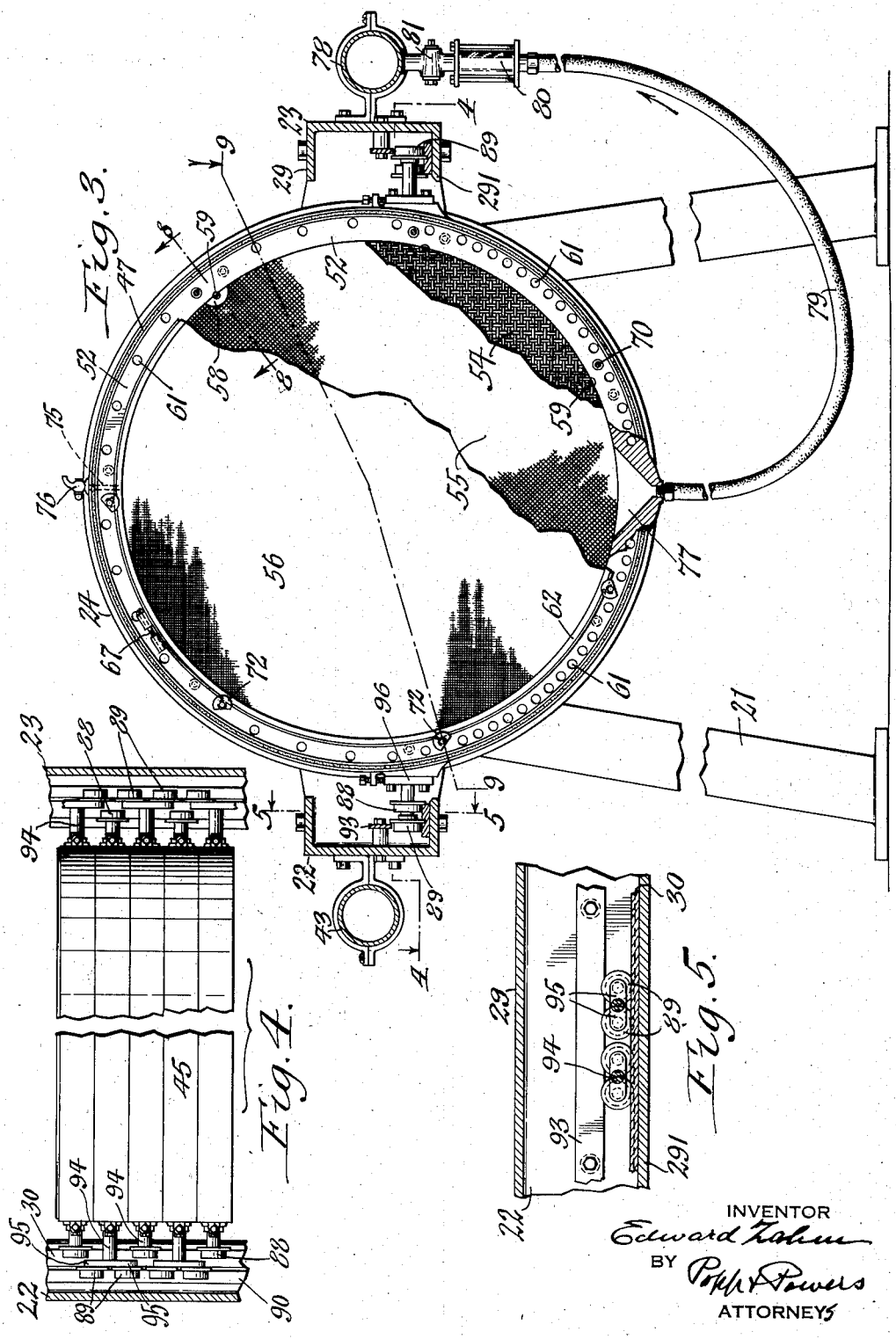

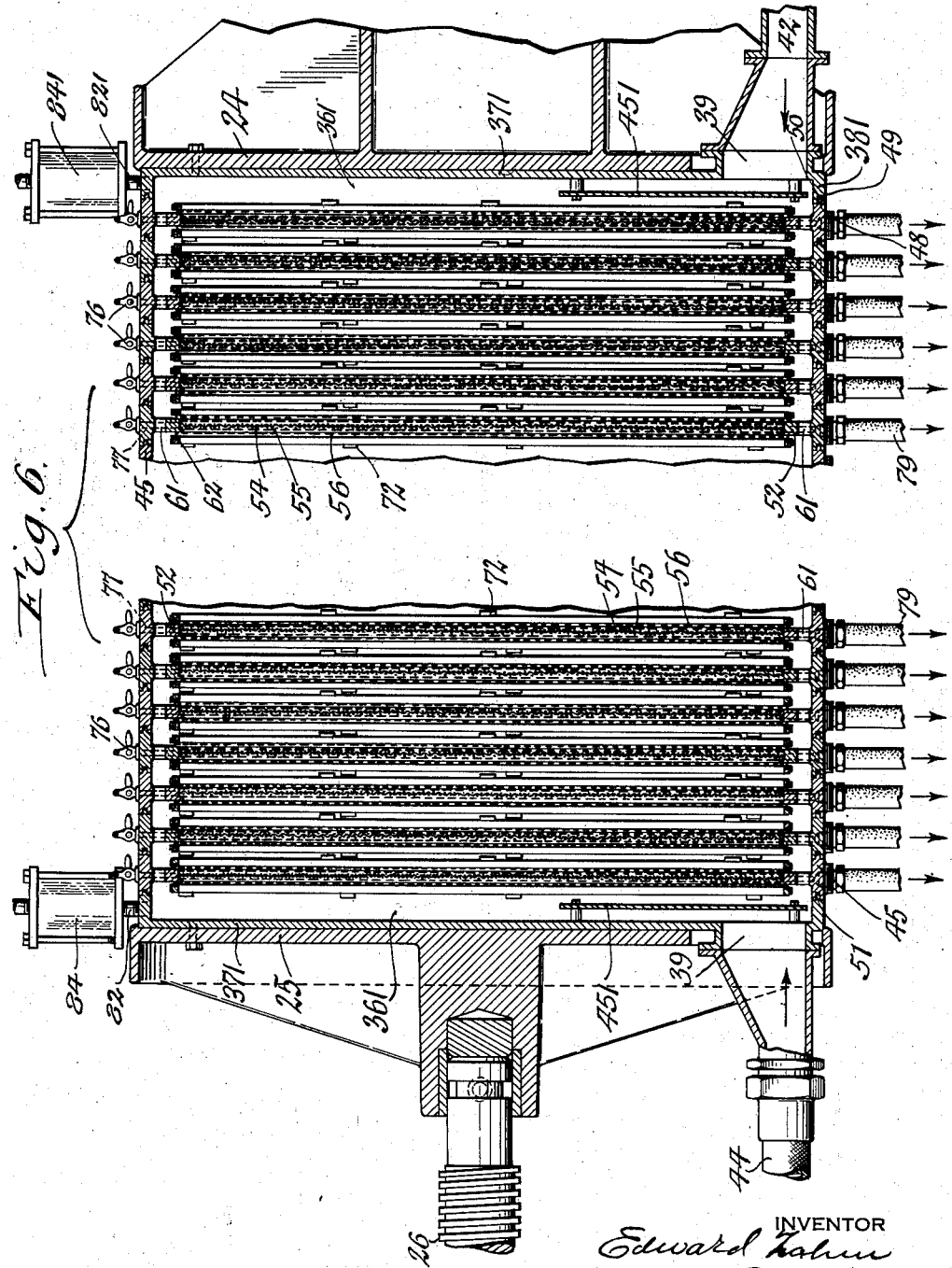

Feb. 12, 1935.  E. ZAHM  1,991,187
FILTER
Filed Dec. 23, 1933  5 Sheets-Sheet 5
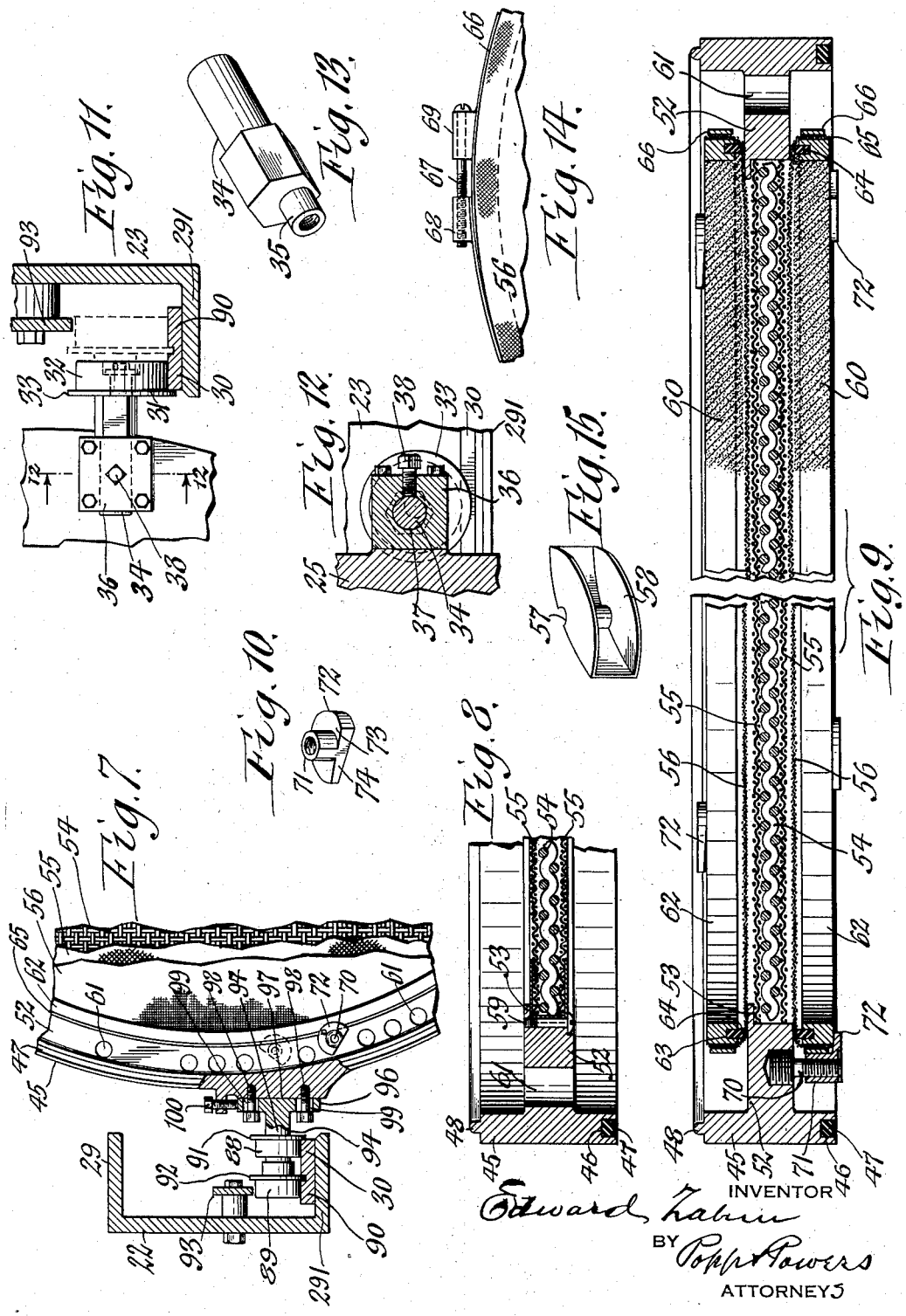

Patented Feb. 12, 1935

1,991,187

UNITED STATES PATENT OFFICE 1,991,187

FILTER

Edward Zahm, Buffalo, N. Y., assignor to Zahm & Nagel Co. Inc., Buffalo, N. Y., a corporation of New York Application December 23, 1933, Serial No. 703,700

10 Claims. (Cl. 210—188)

This invention relates to a filter of the type in which a plurality of filtering units are arranged in a horizontal row and adapted to be moved against one another when it is desired to use the filter and to be separated from each other for the purpose of cleaning, inspecting or repairing the same.

Filters of this character are usually employed for clarifying beer and other liquids which have previously been mixed with Kieselguhr, infusurial earth or similar granular material to form filtering cakes, beds or bodies by which the clarification of the liquid is promoted.

The objects of this invention are to provide a filter of this character which is leak-proof when the parts are assembled for use, which is so constructed that the parts are readily accessible for inspection, cleaning and repairing, and which can be quickly and conveniently emptied without losing a substantial amount of the beer or other liquid which is being filtered.

In the accompanying drawings:

Figure 3 is a vertical transverse section taken on line 3—3 Fig. 2.

Figure 4 is a fragmentary horizontal section taken on line 4—4 Fig. 3.

Figure 5 is a fragmentary vertical longitudinal section taken on line 5—5 Fig. 3.

Figure 6 is a fragmentary vertical longitudinal section, on an enlarged scale, taken on line 6—6 Fig. 1.

Figure 7 is a fragmentary vertical transverse section, on an enlarged scale, taken on line 7—7 Fig. 1.

Figure 8 is a fragmentary cross section of the marginal parts of one of the filtering units taken on line 8—8 Fig. 3.

Figure 9 is a cross section, on an enlarged scale, of one of the filtering units taken on line 9—9 Fig. 3.

Figure 10 is a perspective view of the fastening turn button shown in Fig. 7.

Figure 11 is a fragmentary vertical section, on an enlarged scale, taken on line 11—11 Fig. 1.

Figure 12 is a fragmentary vertical longitudinal sectional taken on line 12—12 Fig. 11.

Figure 13 is a perspective view of the roller adjusting shank shown in Fig. 11.

Figure 14 is a fragmentary side view of one of the cloth supporting rings showing the means for fastening the filtering cloth thereto.

Figure 15 is a perspective view of one of the clips applied to the periphery of the wire screen element and adapted to receive a fastening screw.

In the following description similar characters of reference indicate like parts in the several figures of the drawings:

Figure 1:
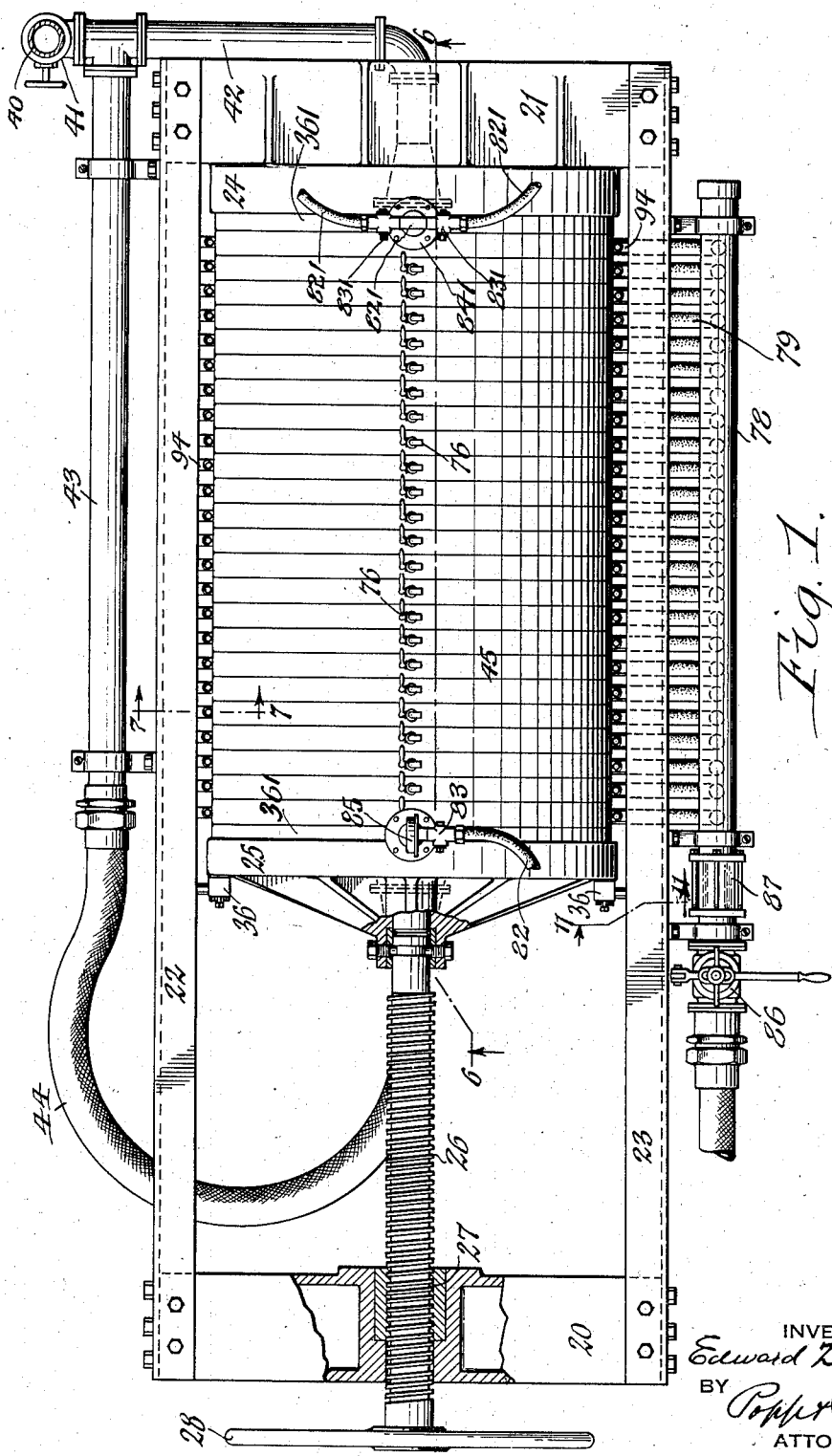
Figure 1 is a top plan view, partly in section, of a filter embodying my improvements, showing the parts of the filter closed ready for use.
Figure 2:
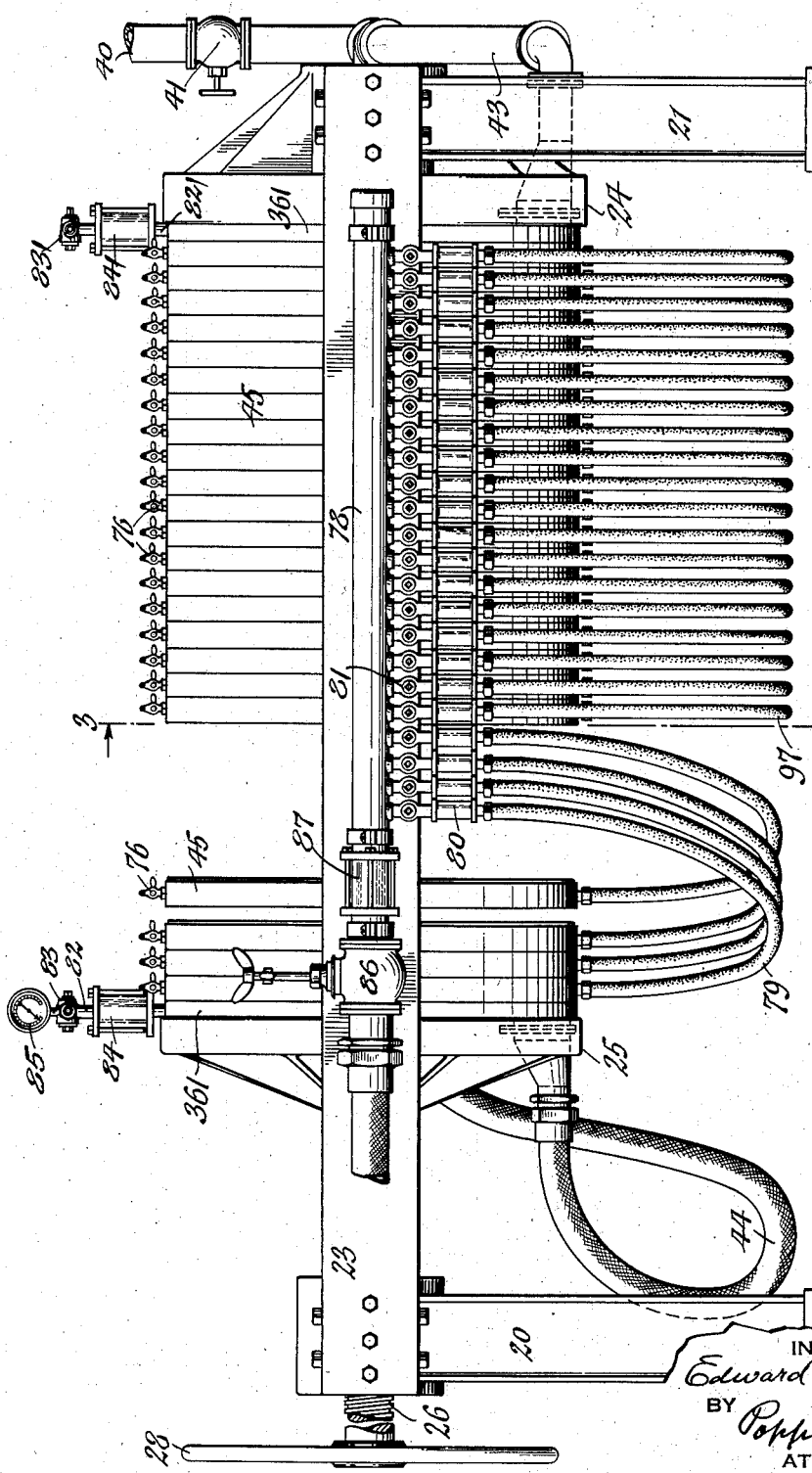
Figure 2 is a side elevation of the same, but showing the filter units separated in some places to permit of inspecting, cleaning or repairing the same.

The main frame of the filter may be of any suitable construction to support the various working parts and in the present case consists generally of two transverse standards 20, 21 arranged at the front and rear ends of the main frame and two horizontal beams 22, 23 arranged on opposite sides of the center of the filter and connected with opposite sides of the standards, as best shown in Figs. 1, 2 and 3.

On the inner side of the rear standard is arranged the fixed head 24 which is preferably formed integrally with this standard. On the inner side of the front standard is arranged the movable head or follower 25 which is adjustable lengthwise between the beams of the main frame toward and from the fixed rear head by any suitable means, for example by the means shown in Figs. 1, 2 and 6 and comprising a horizontal longitudinal adjusting screw 26 working in a screw nut 27 on the front standard and provided at its outer end with a hand wheel 28 for turning the same manually while its inner end is connected with said front head so that the latter and the adjusting screw move in unison lengthwise of the filter but the screw is free to turn independently of the front head.

Each of the longitudinal beams of the main frame is made of U-shaped iron, the channel or concave side of which faces inwardly and has its upper and lower flanges 29, 291 projecting inwardly. The front head 25 is movably supported at its horizontally opposite sides on the lower flanges of the frame beams by means of inner rails 30 secured upon the upper side of the inner parts of the lower beam flanges, and supporting rollers 31 mounted on opposite sides of the front head and having a tread 32 running on the upper side of the rail 30, and having its peripheral flange 33 engaging with the inner side of this rail. Each of these supporting rollers is pivotally connected and adjustably connected with the adjacent part of the front head by a horizontal transverse shank 34 provided at its outer end with a trunnion 35 upon which the respective roller is journaled, a guide block 36 secured to the adjacent part of the front head and provided with a horizontal transverse guideway 37 in which the inner end of the shank 34 is slidable lengthwise, and a set screw 38 mounted on the block 36 and engaging the shank 34 for holding the latter in place.

In the preferred construction the trunnion 35 is arranged eccentrically relatively to the axis of the shank so that by turning the shank and trunnion about the axis of the shank the respective side of the movable head may be raised or lowered for accurately assembling the front and rear heads and the filter units between the same. By these means the supporting rollers may be readily adjusted on the front head so as to run properly on the rails 30 and maintain the front head in its central position relative to the longitudinal axis of the front and rear heads and the filtering units arranged between the same as will presently appear.

On its inner side each of the filter heads is provided with a distributing chamber 361 which receives the liquid to be filtered and delivers the same to the several filter units between the heads. Each of these distributing chambers is provided with a transverse outer wall 371 of disk form which is secured to the respective head and a peripheral wall 381 projecting lengthwise toward the other head. In its lower part the transverse wall of each distributing chamber is provided with a port 39 through which normally the liquid to be filtered and the kieselguhr mixed therewith is admitted. This liquid and filtering material may be supplied from any suitable source to said inlet ports by a supply pipe 40 containing a controlling valve 41, a fixed transverse branch pipe 42 connecting directly with the inlet 39 of the distributing chamber 36 of the fixed head 24, and a fixed longitudinal branch pipe 43 mounted on the main frame and connecting indirectly through the medium of a flexible hose 44 with the inlet port 39 of the distributing chamber of the movable head, as shown in Figs. 1, 2 and 6. Within each distributing chamber and across the respective inlet port 39 thereof is arranged a baffle 451 which has the form of a plate and secured in spaced relation to the inner side of the respective transverse wall 37 so that the baffle spreads liquid radially in the distributing chamber upon entering through the inlet port thereof.

In the space between the front and rear heads 24 and 25 is arranged a longitudinal row of filtering units which cooperate with each other and the distributing chambers, and as these units are identical in construction the following description of one will apply to all of them:

The numeral 45 represents an annular wall section or ring which forms the outer annular wall of one filter unit and which together with corresponding rings of other units and the end distributing chambers forms the enclosing casing for the several filtering elements whereby the clarification of the liquid is effected. On one of its edges this wall ring is provided with an annular groove 46 which contains a packing ring or gasket 47 of rubber or the like and on its opposite edge this wall ring is provided with an annular tenon or rib 48 which is adapted to engage with the packing ring of an adjacent wall ring. On its free edge the annular flange 381 of one distributing chamber is provided with an annular groove 49 containing a packing ring 50 of rubber or the like, which is adapted to be engaged by the tenon or rib 48 on the adjacent wall ring 45 and the annular wall or flange of the other distributing chamber is provided with an annular tenon or rib 51 which engages with the packing ring 47 of the adjacent wall ring 45. When the several wall rings and distributing chambers are thus assembled a leak-tight casing or enclosure is formed for the several filtering units.

Extending inwardly from the circular bore of each wall ring 45 is an annular partition web or flange 52 which is provided with an annular row of longitudinal openings 61 whereby the spaces between opposite sides of the flange 52 of the several wall rings and the distributing chambers are placed in constant communication with each other. Each of these partition flanges 52 is rabbeted on one side of its inner portion so as to form an annular shoulder or seat 53 which faces in one direction lengthwise of the axis of the filter unit. Within the bore of this annular partition, web or flange 52 and bearing with one of its sides against the shoulder 53 is a foraminous or skeleton backing for sustaining fine cloth or woven fabric screens 56 which in turn are covered on their outer sides by the layers 60 of kieselguhr or other granular filtering agent which is employed to clarify the liquid. This foraminous backing preferably comprises a central section 54 of relatively heavy woven wire fabric and two side sections 55 of relatively finer woven wire fabric arranged on opposite sides of the central section and preferably permanently connected therewith by soldering, brazing or in any other suitable manner. This foraminous backing is detachably secured against the shoulder 53 by means of clamping screws 59 passing through the notches 57 in the edges of U-shaped clips 58 secured at intervals to the marginal parts of the foraminous backing and each engaging its threaded end with the partition web or flange 52 while its head bears against that side of the clip opposite to the shoulder 53, as best shown in Figs. 3 and 8.

On opposite sides of the partition flange and the foraminous backing are arranged two fine screens 59 of cloth or the like which are adapted to intercept the kieselguhr 60 and hold the same on the outer side of these screens so that the same forms layers, masses or beds of granular filtering medium which are arranged in the path of the unclarified liquid and permit the clarified liquid to pass inwardly through the filtering layers or beds and into the space within the partition flange while the solid matters or impurities contained in the liquid are held back in these filter beds. Each of these cloth screens extends across one side of the screen backing and the partition flange and is supported and detachably clamped against the respective side of the partition flange by means which are preferably constructed as follows:

The numeral 62 represents a supporting ring which is provided on its inner side with an annular groove 63 in which is seated an annular packing ring or gasket 64 which bears against the outer side of the marginal part of one of the cloth screens and presses the latter tightly against the adjacent side of the respective partition flange so as to produce a leak-tight joint between the screen supporting ring and the partition flange. The cloth screen is detachably secured to the supporting ring by providing the marginal part of this screen with an annular flange 65 which extends outwardly over the periphery of the supporting ring and is secured thereto by a split clamping band 66 engaging the outer peripheral side of the screen flange 65 and having its ends overlapping and detachably connected by a clamping screw 67 connecting two lugs 68, 69 which project laterally from the end portions of said clamping band, as shown in Figs. 3 and 14.

When the filter is in operation a bed, cake, layer or mass 60 of kieselguhr is precoated or built up upon each screen or cloth within the supporting ring 62 of sufficient thickness to effect proper initial filtration. Thereafter filtration is continued by feeding beer and kieselguhr to the filter until the kieselguhr has built up to the limit of the space within the ring 62, as shown in Fig. 9, and when this occurs the dirt-laden kieselguhr is removed from each screen section and filtration resumed by depositing fresh layers of kieselguhr on the screens. This screen ring and the screen virtually form a pan which contains the cake or bed of kieselguhr and supports the same so that it does not slough off during the normal operation of the filter. Removal of the dirt-laden kieselguhr from the screens is preferably effected by separating the screens and directing streams of water against the same and washing the kieselguhr from the screen sections.

Various means may be employed for detachably connecting each cloth screen and its support with the respective partition flange but the fastening for this purpose shown in Figs. 3, 9 and 10 is preferred and constructed as follows:—

The numeral 70 represents a plurality of studs or posts arranged in an annular row on opposite sides of the partition flange of each wall ring 45 and adjacent to the periphery of the respective screen ring 62. An external screw thread on the outer end of each of these studs is engaged by the internally screw threaded hub 71 of a cam turn button or nut 72 which projects laterally from one side only of its hub and is provided with a cam face or incline 73 on its inner side, while the opposite side of the hub is provided with a cut-away or receding face 74. Preparatory to fastening a screen assembly comprising a cloth screen and its supporting ring and clamping band to the partition flange the several cam buttons on the respective side of this flange are first turned so that their receding or cut-away sides 74 face toward the axis of this partition flange and thereby permit the screen assembly to be placed with its packing ring 64 in engagement with the partition flange. Thereafter the several turn buttons are turned in the direction for bringing the salient part of each button over the outer side of the adjacent part of the respective screen supporting ring whereby a wedging action of this button is exerted on this ring due to the threaded connection of the turn button hub and its stud and the incline of the button engaging with the screen ring, thereby pressing the packing ring 64 firmly against the partition flange and producing a tight joint between the same. By means of the threaded connection between the turn button and its stud it is possible to adjust the button relative to the screen ring so that this button can be properly engaged with the screen ring for fastening the screen assembly to the partition flange and also disengaged therefrom preparatory to removing the screen assembly by only turning the button part of a complete rotation in either direction, thereby permitting the screen to be easily and quickly removed and replaced when desired.

In its uppermost part each of the wall rings or sections and its partition flange is provided with a vent port or passage 75 extending from the exterior of the same to the space between the screens 56 on opposite sides of the respective partition flange. This vent is controlled by a vent valve 76 arranged on the exterior of the wall ring, as shown in Figs. 1, 2, 3 and 6.

In its lowermost part each of the wall rings or sections and its partition flange is provided with an outlet port or passage 77 which is of downwardly tapering or conical form and extends from the space between the screens of the respective filter unit outwardly through the partition flange and wall ring.

On the outer side of the main frame opposite to the branch supply pipe 43 is mounted a manifold liquid delivery pipe 78 which is connected with the lower end of the outlet 77 of each filter unit or section by a flexible hose or tube 79, as shown in Figs. 2 and 3, and thus permit each of these sections to be moved lengthwise in the main frame when opening the filter for cleaning, repairing and inspecting purposes without breaking the connection between these filter sections and the manifold delivery pipe. To permit the flow of liquid through each flexible tube 79 to be observed during the operation of using or testing the apparatus a sight glass 80 is connected with each of these tubes and the latter is also provided with an individual valve 81 so that each filter section can be either cut into or out of circuit as desired for determining whether one or another of the filter sections is failing in its operation and requires attention.

On the uppermost part of one of the distributing chambers the same is provided with a nipple or tube 82 for connection with means supplying gas under pressure when it is desired to expel the liquid from the filter, preparatory to cleaning, repairing or inspecting the same. This nipple 82 is provided with a valve 83, a sight glass 84 and a gage 85 for determining the pressure within the filter. The other distributing chamber is provided on its uppermost part with a nipple or tube 821 having a sight glass 841 and one or more valves 831 for permitting samples of the liquid to be taken, or water to be introduced for cleaning the filter or for any other purpose.

The outlet manifold 78 is also provided with a valve 86 and a sight glass 87 for observing the condition of the liquid flowing through the same.

Means are provided for supporting the filter sections or units on the main frame so that the same are reliably held in an upright position and can be easily and readily moved lengthwise of the frame into a closed or assembled position for use, as shown in Fig. 1, or into an open or spread apart position so as to render the working parts of each filtering unit conveniently accessible.

In the preferred construction for accomplishing this purpose the wallring of each filter section is provided on one side with a single supporting roller 88 which runs on the inner wall 30 of the adjacent frame side beam and on its opposite side with a pair of supporting rollers 89 which run on an outer rail 90 arranged lengthwise on the lower flange of the other frame side beam 22, as best shown in Figs. 3, 4 and 5. The single roller is arranged near the axis of the wall ring and is provided with an annular flange 91 at its inner end which bears against the inner edge of the respective inner rail 30, and each of the pair of rollers 89 is provided on its inner end with an annular flange 92 which engages with the inner edge of the respective outer rail 90. By this means the filter unit is held against lateral movement on the frame. Each inner rail 30 and its companion outer rail 90 are preferably constructed of one piece of metal, as best shown in Figs. 3, 4, 7 and 11.

The single roller on one side of each filter unit ring wall is mounted thereon midway between opposite transverse edges of this ring and the pair of rollers on the opposite side of this ring wall are arranged parallel with but equidistant from opposite sides of the axis of the single roller, as shown in Fig. 4, whereby the filter section is balanced and held in an upright position.

In order to prevent the filter sections being accidentally tipped or inclined while separated from one another, a retaining bar 93 is arranged lengthwise over the pairs of rollers running on each of the rails 90 and mounted on the adjacent frame side beam, as shown in Figs. 3, 5, 7 and 11.

The single and double supporting rollers of the several ring walls of the filter sections are so disposed that the same alternate with each other on corresponding sides of these filter sections and each single roller on one section is arranged between but out of line with the pairs of rollers on the same side of the adjacent filter sections, whereby these rollers may be made sufficiently large to be strong and durable and permit of easily shifting the filter sections and at the same time enable the rollers to overlap one another and thus avoid interference between the same when closing the filter sections against one another.

The rollers on opposite sides of each filter section are mounted on the annular wall 45 of the latter so that this section can be adjusted vertically for accurately centering the same relative to the other filter sections and permit the tenon and grooves on opposite edges of the annular walls thereof and on the distributing chambers to properly engage one another. For this purpose each single roller is pivoted directly on the outer end of an arm 94 while the members of each pair of rollers are pivoted on two lugs 95 projecting laterally from opposite sides of the outer end of the respective arm 94 and each of these arms is adjustably mounted at its inner end on the adjacent part of the respective wall ring 45.

In the preferred construction of this adjusting means the same comprises a vertically movable plate 96 arranged on the inner end of the arm 94 and sliding vertically on a guide-way 97 on the adjacent part of the wall ring 45, clamping screws 98 passing through slots 99 in this plate and into the wall ring, and a retaining screw 100 engaging with the upper end of said adjusting plate and mounted on the adjacent part of the wall ring, as best shown in Figs. 3, 4 and 7.

When the filter is operating normally for clarifying liquids the several filter sections are closed and pressed against each other and the distributing chambers by means of the screw 26, as shown in Figs. 1 and 6, and the valves 41, 81 and 86 are opened while the valves 76, 82, and 831 are closed. Due to the pressure against the outer side of the screens and the layers of kieselguhr when the filter is working, these screens are deflected toward each other and bear against opposite sides of the skeleton backing in the partition web 52, as shown at the right in Fig. 9. When this filter is in operation kieselguhr is introduced with the beer or other liquid to be filtered through the inlets 39 at opposite ends of the filter, which mixture is deflected radially outward by the baffles 451 in both distributing chambers 361, then passes successively through the annular row of openings 61 in the partition flanges of the several filter units or sections, and then radially inward to the spaces between the several filter sections. The kieselguhr is held back by the screens 56 and deposited on the outer side of the same while the clarified liquid which separates from the kieselguhr filtering beds passes through the screens and into the spaces between the screens of each filter section.

While the filter is being filled with liquid and the kieselguhr is being deposited on the screens the valve or cock 831 is open to permit the air within the filter to escape, but after the filter is filled with liquid this valve or cock is closed. The cocks 76 are used to release any air or gas which may be trapped in the upper part of each screen section.

The preliminary quantity of liquid which is initially run through the filter for depositing the precoating of kieselguhr on the granular bed may be returned to the source of supply until the filtrate has reached the desired clarity and then re-introduced into the filter while the latter is operating under normal conditions.

The sight glass 80 and cocks 81 are provided for the purpose of observing the clarity of the filtrate of each filtering unit and enables the operator to cut out any one or more of the individual filtering units should the same not be functioning properly without disturbing the operation of the filter as a whole.

After the kieselguhr filter beds or cakes have been thus deposited upon the outer side of the several screens 56 within the supporting rings 62 thereof the liquid to be filtered which is introduced under pressure through the inlets 39 passes through these filter beds and is received in a clarified condition by the receiving chambers formed within the partition flanges of the several filter sections, and then passes through the outlets 77 in the lowermost parts of these sections, the flexible tubes 79 and the manifold 78 to the place provided for storing the filtered liquid, while the impurities or solids removed from the liquid are retained in the bank or cakes of kieselguhr.

When the filter is operating normally the liquid to be clarified fills the entire enclosing casing formed by the end and peripheral walls of the distributing chambers and the peripheral walls of the filter sections inasmuch as the liquid is free to flow through the openings 61 in the partition flanges 52 from one section to another, and also is free to flow radially inward from the peripheral part of the space between opposing filter sections toward the center of the same. By this means the liquid to be filtered is distributed uniformly over the beds or cakes of filtering material on opposite sides of each filter section, and thus insures the maximum filtering capacity.

Inasmuch as the bed of filtering material on each side of the filter section is protected at its periphery by the respective screen supporting ring 62 the liquid to be filtered while flowing inwardly into the space between adjacent filter sections is prevented from disturbing the marginal part of the filter beds on the sections but instead leaves the same intact so that the entire area of each filter bed or cake is of uniform thickness and always in condition to yield the maximum filtering efficiency.

When this filter is used for clarifying beer or the like all the metal parts with which the liquid comes in contact are preferably made of bronze, copper or other noncorrosive material.

By enabling the filter sections or units to be separated in the manner described complete access is afforded for inspecting and cleaning both sides of each section.

Due to the manner of packing the joints between the filter sections and the distributing chambers, and between the screen holders and filter sections leakage is positively prevented.

Owing to the ease with which the cloth screen holders can be removed from the casing rings of the filter sections it is possible to easily and thoroughly scrub both sides of each cloth screen frequently. By removing the split bands of the screen holding rings it is also possible to readily renew the cloth screens when required, and as these screens are pressed against the partition webs by resilient gaskets on the holder rings, wear on these screens is reduced to a minimum.

By the application of gas pressure to the top of the liquid in the casing and drawing off the liquid from the bottom of this casing all the liquid can be removed from the filter, thereby effecting a considerable saving in the filtrate when the filter is shut down for cleaning instead of wasting the same.

Due to feeding the liquid to the filter sections from the periphery toward the axis of the same and through the annular seats formed by the opposing filter cloth sustaining rings, the speed of flow of the liquid across the cakes or layers of granular filtering medium is minimized, thereby avoiding the possibility of disturbing the filtering medium and not only insuring uniform distribution of the liquid over the entire area of filtering cells but also enabling less filtering medium to be used and a corresponding saving in operation to be effected.

As a whole this filtering apparatus is very effective in operation, the same contains no delicate parts which are liable to get out of order, and all of its parts can be readily manipulated when access is required for cleaning, inspection, adjustment, replacement or repairing.

I claim as my invention:—

1. A filter of the character described comprising a frame, longitudinal rails, a fixed head mounted on the frame, a movable head adjustable toward and from the fixed head, filter units arranged between said heads and means for guiding and supporting said movable head on said rails including rollers each engaging its periphery with the top of one of said rails and having an annular flange engaging the side of the rail, and means for adjustably mounting each of said rollers on said movable head, including a shank upon one end of which the respective roll is pivoted, a block secured to said movable head and having a guide-way which receives the other end of said shank, and a set screw working in said block and engaging said shank.

2. A filter of the character described comprising a frame, longitudinal rails, a fixed head mounted on the frame, a movable head adjustable toward and from the fixed head, filter units arranged between said heads and means for guiding and supporting said movable head on said rails including rollers each engaging its periphery with the top of one of said rails and having an annular flange engaging the side of the rail, and means for adjustably mounting each of said rollers on said movable head, including a cylindrical shank provided at one end with an eccentric trunnion on which the respective roller is journaled, and a block which is secured to said movable head and in which the shank is rotatably adjustable.

3. A filter of the character described comprising a main frame, relatively movable heads mounted on the frame, and a plurality of filter sections arranged between said heads and each section including an annular outer wall which is adapted to engage its edges with corresponding walls of adjacent sections to form an enclosing casing, an annular partition web projecting radially inward from each of said annular walls and forming a liquid receiving space within the bore of the web, and said web being provided with an annular shoulder, a skeleton backing arranged within the bore of said web and engaging said shoulder, means for fastening said backing against said shoulder, comprising clips arranged at the peripheral edge of said backing and each provided on its outer side with a notch and fastening screws arranged in said notches having heads engaging said clips and threads engaging said web.

4. A filter of the character described comprising a main frame, relatively movable heads mounted on the frame, and a plurality of filter sections arranged between said heads and each section including an annular outer wall which is adapted to engage its edges with corresponding walls of adjacent sections to form an enclosing casing, an annular partition web projecting radially inward from each of said annular walls and forming a liquid receiving space within the bore of the web, and said web being provided with an annular shoulder, a skeleton backing arranged within the bore of said web and engaging said shoulder, means for fastening said backing against said shoulder, and screen elements arranged on opposite sides of said backing, and each screen element including a body of fine screen fabric extending across one side of said backing and having its peripheral part engaging with one side of said web and provided with an outwardly extending flange, a supporting ring arranged within said flange, a packing ring arranged on the inner edge of said ring and bearing against said screen body opposite to said web, and means for securing said screen flange to said supporting ring.

5. A filter of the character described comprising a main frame, relatively movable heads mounted on the frame, and a plurality of filter sections arranged between said heads and each section including an annular outer wall which is adapted to engage its edges with corresponding walls of adjacent sections to form an enclosing casing, an annular partition web projecting radially inward from each of said annular walls and forming a liquid receiving space within the bore of the web, and said web being provided with an annular shoulder, a skeleton backing arranged within the bore of said web and engaging said shoulder, means for fastening said backing against said shoulder, and screen elements arranged on opposite sides of said backing, and each screen element including a body of fine screen fabric extending across one side of said backing and having its peripheral part engaging with one side of said web and provided with an outwardly extending flange, a supporting ring arranged within said flange, a packing ring arranged on the inner edge of said ring and bearing against said screen body opposite to said web, and means for securing said screen flange to said supporting ring, consisting of a split band surrounding said flange and provided at its ends with lugs, and a fastening screw connecting said lugs.

6. A filter of the character described comprising a main frame, relatively movable heads mounted on the frame, and a plurality of filter sections arranged between said heads and each section including an annular outer wall which is adapted to engage its edges with corresponding walls of adjacent sections to form an enclosing casing, an annular partition web projecting radially inward from each of said annular walls and forming a liquid receiving space within the bore of the web, screen elements engaging opposite sides of said web, and means for detachably connecting each screen element with said web, including a plurality of studs secured to said web and each having an external screw thread on its outer end, and a plurality of turn buttons each having a threaded hub engaging one of said studs and a peripheral flange projecting from one side only of said hub and having a cam or inclined face on its inner side which engages the outer side of the adjacent peripheral part of said screen element.

7. A filter of the character described comprising a main frame having two longitudinal side beams, a plurality of filter sections movable lengthwise on said beams, and means for guiding said sections on said beams and holding them in an upright position, including rollers arranged on opposite sides of each filter section and running on said beams, and means for adjusting the rollers and filter sections vertically relatively to each other, including arms upon the outer ends of which said rollers are mounted, plates arranged on the inner ends of said arms and slidable vertically on guideways on the respective filter section, and clamping screws entering the filtering sections and passing through vertical slots in said plates.

8. A filter of the character described comprising a main frame having two longitudinal side beams, a plurality of filter sections movable lengthwise on said beams, and means for guiding said sections on said beams and holding them in an upright position, including rollers arranged on opposite sides of each filter section and running on said beams, and means for adjusting the rollers and filter sections vertically relatively to each other, including arms upon the outer ends of which said rollers are mounted, plates arranged on the inner ends of said arms and slidable vertically on guideways on the respective filter section, clamping screws entering the filtering section and passing through vertical slots in said plates, and retaining screws arranged on the filter sections and engaging with the upper ends of said plates.

9. A filter of the character described comprising a main frame having two longitudinal side beams, a plurality of filter sections movable lengthwise on said beams, and means for guiding said sections on said beams and holding them in an upright position, including a single roller arranged on one side of each filter section and running on one of said beams and a pair of rollers mounted on the other side of the respective filter section on opposite sides of the axis of said single roller and running on the other beam of said frame, and means for holding the pairs of rollers in engagement with the respective beam.

10. A filter of the character described comprising a main frame having two longitudinal side beams, a plurality of filter sections movable lengthwise on said beams, and means for guiding said sections on said beams and holding them in an upright position, including a single roller arranged on one side of each filter section and running on one of said beams and a pair of rollers mounted on the other side of the respective filter section on opposite sides of the axis of said single roller and running on the other beam of said frame, and means for holding the pairs of rollers in engagement with the respective beam, including a retaining bar mounted on each beam and arranged over the pairs of rollers engaging with the respective beam.

EDWARD ZAHM.